United States Patent [19]
Okano

[11] 3,713,644
[45] Jan. 30, 1973

[54] SHEET FILM CURL CORRECTING DEVICE

[75] Inventor: Takeshi Okano, Nishinomiya, Japan

[73] Assignee: Fuji Shashin Film Kabushiki Kaisha, Kanagawa-ken, Japan

[22] Filed: April 29, 1971

[21] Appl. No.: 138,533

[30] Foreign Application Priority Data

May 18, 1970    Japan ................................. 45/48075

[52] U.S. Cl. .......................... 271/8, 271/54, 353/117
[51] Int. Cl. .............................................. B65h 3/66
[58] Field of Search ............. 271/8, 63, 54, 3, 84, 64; 226/199, 198, 91; 353/117, 118, 27

[56]                References Cited

UNITED STATES PATENTS

| | | |
|---|---|---|
| 3,349,668 | 10/1967 | Zweidinger ........................... 353/117 |
| 1,939,238 | 12/1933 | Stuber et al. ........................... 226/91 |
| 1,801,760 | 4/1931 | Whiteman ......................... 271/64 X |
| 3,167,216 | 1/1965 | Hanker et al. .................. 271/86 U X |

*Primary Examiner*—Evon C. Blunk
*Assistant Examiner*—Bruce H. Stoner, Jr.
*Attorney*—Stevens, Davis, Miller & Mosher

[57]                ABSTRACT

A sheet film curl correcting device so operative that it is closed towards the leading edge of a sheet film in association with the operation of a film inserting mechanism, immediately before said sheet film is inserted into a predetermined position of a film magazine, thereby to guide said film from both sides with a slight space therebetween, and is opened immediately after the leading edge of the film has been inserted into the magazine.

6 Claims, 5 Drawing Figures

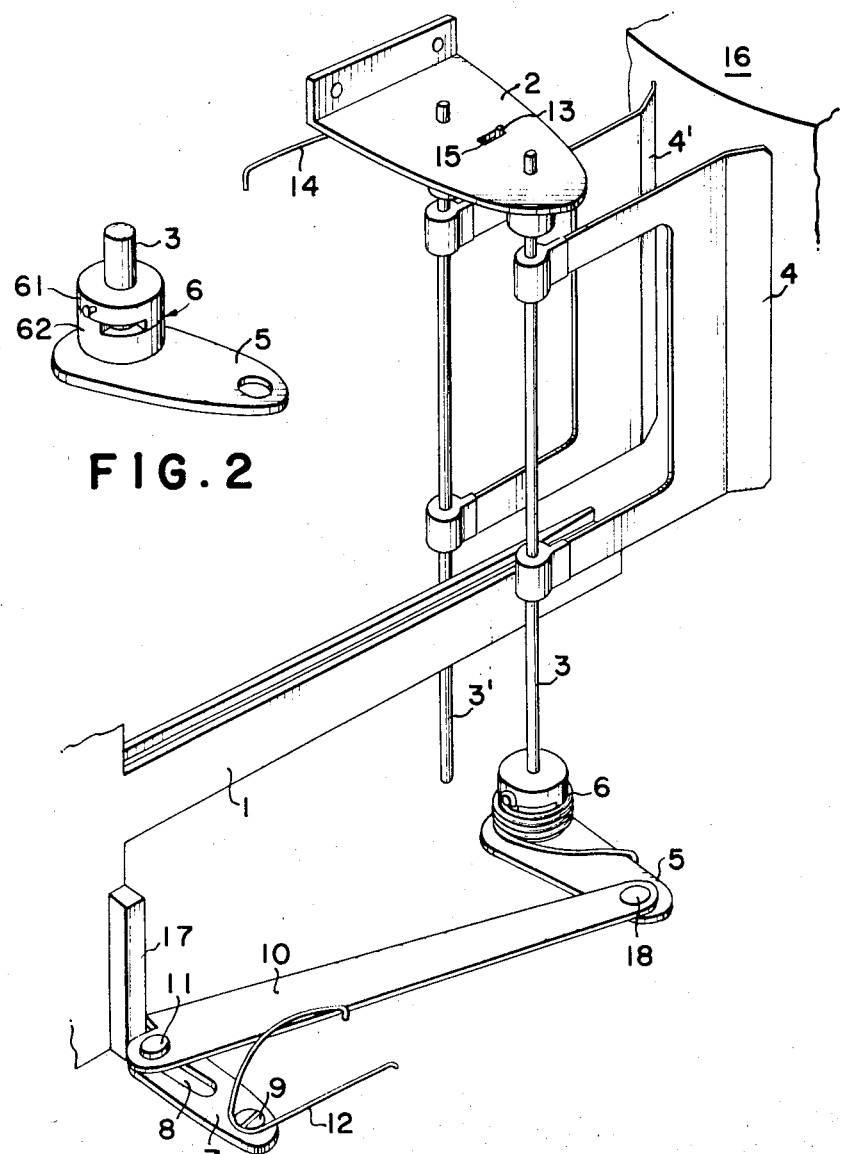

SHEET FILM CURL CORRECTING DEVICE

BACKGROUND OF THE INVENTION

1. Field of the Invention

This invention relates to a film curl correcting device and more specifically to a device for temporarily correcting a curl of a sheet film, such as microfiche, when said sheet film is inserted into a predetermined position of a film magazine or the like, to provide for easy and positive insertion of the film.

2. Description of the Prior Art

In a device for automatically inserting a sheet film into a predetermined position of a film magazine, it is possible because of the curling tendency of the film that the leading edge of the film being inserted collides against the edge of the narrow opening of the magazine compartment or against the edge of a film stored in said compartment, with the result that the film cannot be inserted smoothly or that it becomes flexed and unserviceable.

In such a case, therefore, it is desirable to correct the curl of the film even temporarily so that the film may be inserted easily and positively.

SUMMARY OF THE INVENTION

An object of the present invention is to provide a device for temporarily correcting the curl of a sheet film in the insertion of said film into a storage position, so as to meet the aforesaid desire.

Another object of the invention is to provide a curl correcting device which performs its curl correcting operation in association with the film inserting operation.

A further important object of the invention is to provide a device for correcting the film curl temporarily in a very short period of time immediately before the film insertion, so that the film is not damaged during the insertion.

In order to attain the objects set forth above, according to the present invention there is provided a device including a mechanism for operating clamping plates which are adapted to correct a curl of a film by temporarily clamping said film from both sides immediately before insertion, in association with the operation of a mechanism for inserting the film into a predetermined position of a film magazine.

BRIEF DESCRIPTION OF THE DRAWING

FIG. 1 is a perspective view of the device according to the present invention;

FIGS. 2 and 3 are perspective views of the essential portions of the device of FIG. 1;

DESCRIPTION OF THE PREFERRED EMBODIMENT

Figure 3:
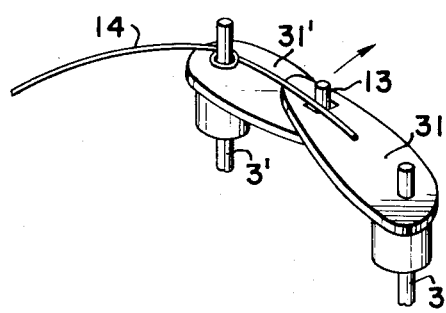

With reference to FIG. 1 which illustrates a clamping plate operating mechanism, reference numeral 1 designates a microfiche carrier frame; 2 a bracket plate fixed to a machine wall; 3, 3' rotary shafts having their upper ends journaled in said bracket plate 2 and the lower ends in a bottom wall of the machine; 4, 4' clamping plates fixed to said rotary shafts 3, 3' respectively; 5 a lever connected to said rotary shaft 3 through a spring-biased clutch 6; 7 a lever having a slit 8 therein and pivotable about a pin 9; 10 a lever having one end thereof pivotally connected to the lever 5 by a pin 18 and provided at the other end with a pin 11 which is slidably received in the slit 8 formed in said lever 7; and 12 a spring which urges said lever 10 to rotate in a clockwise direction about the pin 18. Reference numeral 16 designates a microfiche magazine and 17 a bar carried on the carrier frame 1.

FIG. 2 is a perspective view showing the spring-biased clutch 6, with the spring removed. In FIG. 2, reference numeral 61 designates an upper member of the clutch secured to the rotary shaft 3, and 62 designates a lower member of the clutch fixed on the lever 5. The upper member 61 and the lower member 62 of the clutch are held out of engagement with each other by the spring, so that in the normal condition the rotational force of the lever 5 is transmitted to the rotary shaft 3, but when an external force is applied to the rotary shaft 3 to prevent the rotation thereof, the space between the teeth of the respective members is narrowed against the biasing force of the spring and the rotational force of the lever 5 is not transmitted to the rotary shaft 3.

FIG. 3 shows the construction of the upper end portions of the rotary shafts 3, 3' in FIG. 1, with the bracket plate 2 removed. In FIG. 3, reference numerals 31, 31' designate levers fixed to the upper end portions of the rotary shafts 3, 3' respectively; 13 a pin fixed on an end portion of the lever 31' and extending upwards through a hole in the lever 31; and 14 a spring which urges said pin 13 to move in the direction of the arrow. In FIG. 1, reference numeral 15 designates a slit formed in the bracket plate 3 to limit the movement of said pin 13.

Figure 4:
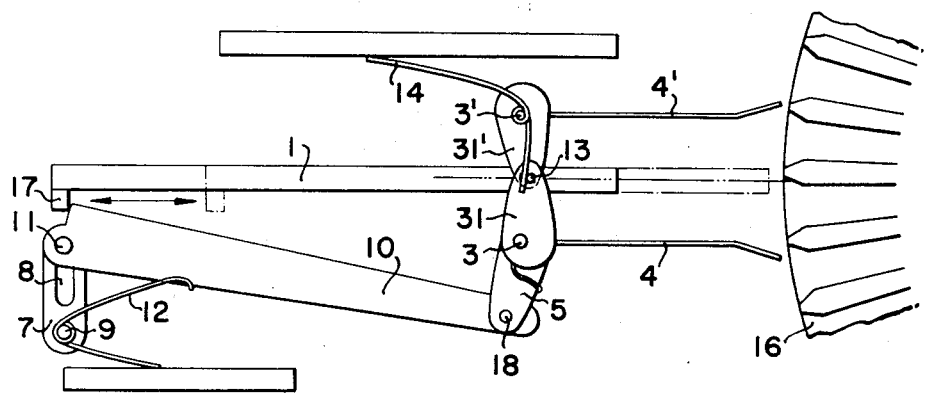
FIG. 4 is a diagrammatical plan view of the device of the invention.

FIG. 4 is a plan view for explaining the operation of the device shown in FIGS. 1 to 3. Since the pin is urged to the right by the spring 14, the rotary shafts 3, 3' constantly undergo a force to open the clamping plates. Further, since the movement of the pin 13 is limited by the slit 15 shown in FIG. 1, the degree of opening of the clamping plates 4, 4' is constant. In the opened state of the clamping plates 4, 4', a specific microfiche is selectively drawn out from the magazine by a mechanism not shown which moves into the space between said clamping plates, and placed on the carrier frame 1 which is inserted between the rotary shafts 3, 3' in association with the operation of said mechanism. Then, the microfiche drawing mechanism and the carrier frame 1 move to the left between the clamping plates 4, 4'. In this case, the bar 17 also moves to the left along one side of the lever 10 by being carried on the carrier frame 1. Since the bar 17 moves in parallel to the carrier frame 1, the lever 10 is caused to pivot about the pin 18 against the biasing force of the spring 12 and hence the pin 11 slidably moves in the slit 8. The bar 17 reaches the left end extremity of the lever 10 when the microfiche has been completely drawn out by the carrier frame 1, and then moves off the side edge of said lever 10. The lever 10 is allowed to return to its original position under the biasing force of the spring 12. The movement of the lever 10 during this period has no influence on the degree of opening of the clamping plates 4, 4'.

Now, when the carrier frame 1 moves to the right to return the thus drawn microfiche into the magazine 16, the bar 17 abuts against the leftward end of the lever 10, urging said lever to the right. Therefore, the lever 5 is caused to pivot in a counterclockwise direction about the rotary shaft 3. In this case, the clutch shown in FIG. 2 does not slip and the movement of the lever 5 is transmitted to the rotary shaft 3 causing said rotary shaft to rotate. By the rotation of the rotary shaft 3, the clamping plate 4 is brought into a closed position. At the same time, the pin 13 is moved to the left against the biasing force of the spring 14, so that the rotary shaft 3' is rotated and the clamping plate 4' is also brought into a closed position. When the pin 13 is brought into abutment against the other end of the slit 15 and a predetermined gap is formed between the clamping plates 4, 4' in the closed positions, a large force acts between the unrotating rotary shaft 3 and the lever 5 which is still rotated by the lever 10, and a slipping motion occurs in the clutch 6. The gap between the clamping plates 4, 4' is maintained constant during this period. In the closed position of the clamping plates, the gap between said clamping plates is narrowest at their forward edge portions and the forward edges of said clamping plates are located very close to the opening of the magazine compartment. The bar 17 is disengaged from the lever 10 during the slipping motion of the clutch 6 and, therefore, the clamping plates 4, 4' are opened.

The bar 17 and the mechanisms shown in FIGS. 1 to 4 are constructed and arranged such that the clamping plates 4, 4' are closed just in front of the opening of the magazine compartment immediately before the rightward edge of the microfiche, being carried to the right on the carrier frame 1, is inserted into said opening, and are opened immediately after the insertion. Therefore, the microfiche is clamped from both sides by the clamping plates 4, 4' immediately before it is inserted into the opening of the predetermined compartment of the magazine 16 to have the curl at the forward edge thereof corrected. The clamping plates 4, 4' define a slight gap therebetween even when they are in the closest position relative to each other, so as to prevent the creation of large frictional resistance between the microfiche and the clamping plates. By correcting the curl in the manner described, the difficulty with the microfiche being curled and damaged due to collision against the edge of the narrow magazine compartment opening or the edge of a microfiche stored in the compartment can be markedly lessened. The clamping plates cause no damage to the surfaces of the microfiche as they clamp only the edge portion of the microfiche for only a very short period of time just before the insertion, to correct the curl.

The clamping plates 4, 4' operate just in front of the opening of the magazine compartment, only when the microfiche is inserted into the magazine. By tapering the outer edge of each partition wall of the magazine as shown in FIG. 4 and closing the clamping plates 4, 4' in a manner to guide the microfiche towards the tapered surface of said partition wall, the microfiche proceeds along said tapered surface to be placed between said partition wall and the other microfiche in the compartment. Thus, it is possible to insert the microfiche without colliding against the edge of the narrow compartment opening or against the edge of the other microfiche.

Figure 5:
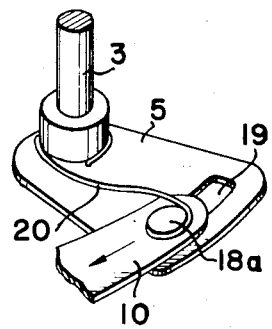
FIG. 5 is a perspective view of another arrangement of the portion shown in FIG. 2.

FIG. 5 shows an arrangement which can be used in lieu of the spring-biased clutch in the embodiment shown in FIGS. 1 to 4. In this arrangement, the rotary shaft 3 and the lever 5 are fixed together and the lever 5 has a slit 19 formed therein, in which a pin 18a provided on the lever 10 is slidably received. The pin 18a is biased in the direction of the arrow by a spring 20. This arrangement provides the same function as that of the spring-biased clutch in the embodiment described above.

As stated above, the device of the present invention is designed to correct a curl of a sheet film, such as microfiche, and thereby to avoid the collision of said sheet film against the edge of the narrow opening of the magazine compartment or against the edge of the other microfiche stored in said magazine compartment. The clamping plates are held closed only for a short period of time sufficient to insert the edge of the film into the opening of a magazine compartment, and when the clamping plates are in the open positions, a relatively large-sized mechanism, including the carrier frame, necessary for the drawing from or insertion of the film into the magazine can be moved through the gap between said clamping plates. Once the edge of the film has been inserted, even slightly, into the compartment opening, there is no longer the possibility of the film colliding against the edge of the opening or the edge of the other film, so that the clamping plates are opened immediately and no damage is caused to the film due to the friction between said clamping plates and said film.

I claim:

1. A sheet film curl correcting device comprising a pair of clamping plates pivotably supported for opening and closing operation to move towards the edge of a film from both sides thereof immediately before an edge of a film sheet is inserted into a storage compartment, thereby to guide the film in closely spaced relation while correcting a curl in the film and to move away from the film immediately after the edge of the film is inserted into said storage compartment; intermediate link means connected to said clamping plates for opening and closing the same; film inserting means connected to said link means; said clamping plates being closed when said film has been moved in the film inserting direction to a predetermined position and being opened when said film has passed said position, and said film inserting means being operatively connected to said link means.

2. A sheet film curl correcting device according to claim 1, wherein said intermediate link means and said clamping plates are connected through a spring-biased clutch.

3. A sheet film curl correcting device according to claim 1, wherein said intermediate link means and said clamping plates are connected through a mechanism comprising a member having a slit formed therein, a pin slidably received in said slit and a spring urging said pin towards one end of said slit.

4. A sheet film curl correcting device according to claim 1, wherein said film inserting means in its movement in the film inserting direction is held in engagement with said intermediate link means up to a predetermined position and disengaged therefrom when it has passed said predetermined position.

5. A sheet film curl correcting device according to claim 1, wherein said pair of clamping plates are coupled with each other such that they are always equally spaced from the surfaces of the film.

6. A sheet film curl correcting device according to claim 5, wherein said intermediate link means is connected with only one of said clamping plates.

* * * * *